United States Patent
Hendrix et al.

(10) Patent No.: US 9,325,821 B1
(45) Date of Patent: Apr. 26, 2016

(54) SIDETONE MANAGEMENT IN AN ADAPTIVE NOISE CANCELING (ANC) SYSTEM INCLUDING SECONDARY PATH MODELING

(71) Applicant: Cirrus Logic, Inc., Austin, TX (US)

(72) Inventors: Jon D. Hendrix, Wimberly, TX (US); Ali Abdollahzadeh Milani, Austin, TX (US)

(73) Assignee: CIRRUS LOGIC, INC., Austin, TX (US)

( * ) Notice: Subject to any disclaimer, the term of this patent is extended or adjusted under 35 U.S.C. 154(b) by 436 days.

(21) Appl. No.: 13/686,353

(22) Filed: Nov. 27, 2012

Related U.S. Application Data

(63) Continuation-in-part of application No. 13/249,711, filed on Sep. 30, 2011.

(51) Int. Cl.
*A61F 11/06* (2006.01)
*G10K 11/16* (2006.01)
(Continued)

(52) U.S. Cl.
CPC ............... *H04M 1/03* (2013.01); *G10K 11/175* (2013.01); *H04R 29/00* (2013.01)

(58) Field of Classification Search
CPC .......... H04R 3/04; H04R 3/005; H04R 3/002; H04R 25/505; H04R 5/02; H04R 25/453; H04R 25/407; H04R 29/00; H04R 25/70; H04R 5/027; H04R 27/00; H03G 3/001; H04H 60/04; H04N 11/00; G10L 21/0208
USPC .......... 381/57, 71.1, 26, 71.11, 312, 94.7, 95, 381/92, 313, 71.6, 73.1, 71.9, 60, 56, 300, 381/94.2, 81, 318, 58, 71.14, 71.4, 71.8, 381/94.9, 317, 71.7, 71.12, 119, 71.5, 107; 704/233, 226
See application file for complete search history.

(56) References Cited

U.S. PATENT DOCUMENTS

| 4,020,567 A | 5/1977 | Webster |
| 4,926,464 A | 5/1990 | Schley-May |

(Continued)

FOREIGN PATENT DOCUMENTS

| DE | 102011013343 A1 | 9/2012 |
| EP | 0412902 A2 | 2/1991 |

(Continued)

OTHER PUBLICATIONS

U.S. Appl. No. 13/968,007, filed Aug. 15, 2013, Hendrix, et al.

(Continued)

*Primary Examiner* — Pierre-Louis Desir
*Assistant Examiner* — Anne Thomas-Homescu
(74) *Attorney, Agent, or Firm* — Mitch Harris, Atty at Law, LLC; Andrew M. Harris

(57) ABSTRACT

A wireless telephone includes an adaptive noise canceling (ANC) circuit that adaptively generates an anti-noise signal from a reference microphone signal and injects the anti-noise signal into the speaker or other transducer output to cause cancellation of ambient audio sounds. An error microphone is also provided proximate the speaker to provide an error signal indicative of the effectiveness of the noise cancellation. A secondary path estimating adaptive filter is used to estimate the electro-acoustical path from the noise canceling circuit through the transducer so that source audio can be removed from the error signal. Sidetone is injected into the transducer output, but is not provided to the coefficient control of the secondary path estimating adaptive filter, so that the ambient noise present in the near-end speech microphone signal, and thus present in the sidetone information, does not destabilize the ANC circuit or otherwise cause improper generation of the anti-noise signal.

21 Claims, 4 Drawing Sheets

(51) Int. Cl.
  *H03B 29/00* (2006.01)
  *A61B 7/04* (2006.01)
  *H04B 15/00* (2006.01)
  *H04M 1/03* (2006.01)
  *G10K 11/175* (2006.01)
  *H04R 29/00* (2006.01)

(56) References Cited

U.S. PATENT DOCUMENTS

| | | | |
|---|---|---|---|
| 4,998,241 A | 3/1991 | Brox et al. | |
| 5,018,202 A | 5/1991 | Takahashi | |
| 5,021,753 A | 6/1991 | Chapman | |
| 5,044,373 A | 9/1991 | Northeved et al. | |
| 5,251,263 A * | 10/1993 | Andrea et al. | 381/71.6 |
| 5,278,913 A * | 1/1994 | Delfosse et al. | 381/71.11 |
| 5,321,759 A * | 6/1994 | Yuan | 381/71.9 |
| 5,337,365 A * | 8/1994 | Hamabe et al. | 381/71.12 |
| 5,359,662 A * | 10/1994 | Yuan et al. | 381/71.14 |
| 5,386,477 A | 1/1995 | Popovich et al. | |
| 5,410,605 A * | 4/1995 | Sawada et al. | 381/71.14 |
| 5,425,105 A * | 6/1995 | Lo et al. | 381/71.8 |
| 5,445,517 A * | 8/1995 | Kondou et al. | 431/18 |
| 5,465,413 A * | 11/1995 | Enge et al. | 455/307 |
| 5,481,615 A | 1/1996 | Eatwell et al. | |
| 5,548,681 A * | 8/1996 | Gleaves et al. | 704/233 |
| 5,550,925 A | 8/1996 | Hori et al. | |
| 5,559,893 A | 9/1996 | Krokstad et al. | |
| 5,586,190 A * | 12/1996 | Trantow et al. | 381/71.12 |
| 5,640,450 A * | 6/1997 | Watanabe | 379/392 |
| 5,668,747 A | 9/1997 | Ohashi | |
| 5,687,075 A | 11/1997 | Stothers | |
| 5,696,831 A | 12/1997 | Inanaga et al. | |
| 5,699,437 A * | 12/1997 | Finn | 381/71.7 |
| 5,706,344 A * | 1/1998 | Finn | 379/406.09 |
| 5,740,256 A * | 4/1998 | Castello Da Costa et al. | 381/94.7 |
| 5,768,124 A * | 6/1998 | Stothers et al. | 700/38 |
| 5,815,582 A * | 9/1998 | Claybaugh et al. | 381/71.6 |
| 5,832,095 A * | 11/1998 | Daniels | 381/71.5 |
| 5,852,667 A | 12/1998 | Pan et al. | |
| 5,909,498 A | 6/1999 | Smith | |
| 5,940,519 A | 8/1999 | Kuo | |
| 5,946,391 A * | 8/1999 | Dragwidge et al. | 379/391 |
| 5,991,418 A * | 11/1999 | Kuo | 381/71.11 |
| 6,041,126 A * | 3/2000 | Terai et al. | 381/71.6 |
| 6,118,878 A * | 9/2000 | Jones | 381/72 |
| 6,181,801 B1 | 1/2001 | Puthuff et al. | |
| 6,219,427 B1 * | 4/2001 | Kates et al. | 381/318 |
| 6,278,786 B1 * | 8/2001 | McIntosh | 381/71.6 |
| 6,282,176 B1 | 8/2001 | Hemkumar | |
| 6,304,179 B1 | 10/2001 | Lolito et al. | |
| 6,418,228 B1 * | 7/2002 | Terai et al. | 381/71.8 |
| 6,434,246 B1 * | 8/2002 | Kates et al. | 381/312 |
| 6,434,247 B1 * | 8/2002 | Kates et al. | 381/312 |
| 6,445,799 B1 | 9/2002 | Taenzer et al. | |
| 6,522,746 B1 * | 2/2003 | Marchok et al. | 379/406.03 |
| 6,542,436 B1 | 4/2003 | Myllyla | |
| 6,650,701 B1 | 11/2003 | Hsiang et al. | |
| 6,683,960 B1 * | 1/2004 | Fujii et al. | 381/71.8 |
| 6,738,482 B1 | 5/2004 | Jaber | |
| 6,766,292 B1 | 7/2004 | Chandran et al. | |
| 6,768,795 B2 | 7/2004 | Feltstrom et al. | |
| 6,792,107 B2 | 9/2004 | Tucker et al. | |
| 6,850,617 B1 * | 2/2005 | Weigand | 379/391 |
| 6,940,982 B1 * | 9/2005 | Watkins | 381/71.1 |
| 7,016,504 B1 | 3/2006 | Shennib | |
| 7,058,463 B1 * | 6/2006 | Ruha et al. | 700/94 |
| 7,103,188 B1 * | 9/2006 | Jones | 381/71.9 |
| 7,181,030 B2 * | 2/2007 | Rasmussen et al. | 381/312 |
| 7,330,739 B2 * | 2/2008 | Somayajula | 455/570 |
| 7,365,669 B1 * | 4/2008 | Melanson | 341/143 |
| 7,466,838 B1 | 12/2008 | Moseley | |
| 7,680,456 B2 * | 3/2010 | Muhammad et al. | 455/63.1 |
| 7,742,746 B2 | 6/2010 | Xiang et al. | |
| 7,742,790 B2 * | 6/2010 | Konchitsky et al. | 455/570 |
| 7,817,808 B2 | 10/2010 | Konchitsky et al. | |
| 7,953,231 B2 | 5/2011 | Ishida | |
| 8,019,050 B2 * | 9/2011 | Mactavish et al. | 379/22.08 |
| 8,085,966 B2 | 12/2011 | Amsel | |
| D666,169 S | 8/2012 | Tucker et al. | |
| 8,249,262 B2 * | 8/2012 | Chua et al. | 381/60 |
| 8,251,903 B2 | 8/2012 | LeBoeuf et al. | |
| 8,290,537 B2 | 10/2012 | Lee et al. | |
| 8,331,604 B2 | 12/2012 | Saito et al. | |
| 8,379,884 B2 | 2/2013 | Horibe et al. | |
| 8,401,200 B2 * | 3/2013 | Tiscareno et al. | 381/58 |
| 8,442,251 B2 * | 5/2013 | Jensen et al. | 381/318 |
| 8,526,627 B2 * | 9/2013 | Asao et al. | 381/71.1 |
| 8,559,661 B2 | 10/2013 | Tanghe | |
| 8,600,085 B2 | 12/2013 | Chen et al. | |
| 8,775,172 B2 | 7/2014 | Konchitsky et al. | |
| 8,804,974 B1 | 8/2014 | Melanson | |
| 8,831,239 B2 | 9/2014 | Bakalos | |
| 8,842,848 B2 | 9/2014 | Donaldson et al. | |
| 8,855,330 B2 | 10/2014 | Taenzer | |
| 8,907,829 B1 * | 12/2014 | Naderi | 341/143 |
| 8,908,877 B2 | 12/2014 | Abdollahzadeh Milani et al. | |
| 8,958,571 B2 * | 2/2015 | Kwatra et al. | 381/94.1 |
| 9,066,176 B2 | 6/2015 | Hendrix et al. | |
| 9,071,724 B2 | 6/2015 | Do et al. | |
| 9,129,586 B2 | 9/2015 | Bajic et al. | |
| 2001/0053228 A1 * | 12/2001 | Jones | 381/71.6 |
| 2002/0003887 A1 * | 1/2002 | Zhang et al. | 381/71.1 |
| 2002/0090078 A1 * | 7/2002 | Feltstrom et al. | 379/390.01 |
| 2003/0063759 A1 * | 4/2003 | Brennan et al. | 381/92 |
| 2003/0072439 A1 | 4/2003 | Gupta | |
| 2003/0185403 A1 | 10/2003 | Sibbald | |
| 2004/0047464 A1 * | 3/2004 | Yu et al. | 379/392.01 |
| 2004/0120535 A1 | 6/2004 | Woods | |
| 2004/0165736 A1 * | 8/2004 | Hetherington et al. | 381/94.3 |
| 2004/0167777 A1 * | 8/2004 | Hetherington et al. | 704/226 |
| 2004/0202333 A1 | 10/2004 | Csermak et al. | |
| 2004/0240677 A1 | 12/2004 | Onishi et al. | |
| 2004/0242160 A1 | 12/2004 | Ichikawa et al. | |
| 2004/0264706 A1 * | 12/2004 | Ray et al. | 381/71.11 |
| 2005/0004796 A1 * | 1/2005 | Trump et al. | 704/225 |
| 2005/0018862 A1 | 1/2005 | Fisher | |
| 2005/0117754 A1 * | 6/2005 | Sakawaki | 381/71.6 |
| 2005/0207585 A1 * | 9/2005 | Christoph | 381/71.11 |
| 2005/0240401 A1 * | 10/2005 | Ebenezer | 704/226 |
| 2006/0035593 A1 * | 2/2006 | Leeds | 455/67.13 |
| 2006/0055910 A1 | 3/2006 | Lee | |
| 2006/0069556 A1 * | 3/2006 | Nadjar et al. | 704/229 |
| 2006/0153400 A1 | 7/2006 | Fujita et al. | |
| 2006/0159282 A1 | 7/2006 | Borsch | |
| 2006/0161428 A1 | 7/2006 | Fouret | |
| 2006/0251266 A1 | 11/2006 | Saunders et al. | |
| 2007/0030989 A1 * | 2/2007 | Kates | 381/317 |
| 2007/0033029 A1 * | 2/2007 | Sakawaki | 704/233 |
| 2007/0038441 A1 | 2/2007 | Inoue et al. | |
| 2007/0047742 A1 | 3/2007 | Taenzer et al. | |
| 2007/0053524 A1 | 3/2007 | Haulick et al. | |
| 2007/0076896 A1 * | 4/2007 | Hosaka et al. | 381/71.11 |
| 2007/0154031 A1 | 7/2007 | Avendano et al. | |
| 2007/0258597 A1 * | 11/2007 | Rasmussen et al. | 381/26 |
| 2007/0297620 A1 * | 12/2007 | Choy | 381/73.1 |
| 2008/0019548 A1 | 1/2008 | Avendano | |
| 2008/0101589 A1 | 5/2008 | Horowitz et al. | |
| 2008/0107281 A1 | 5/2008 | Togami et al. | |
| 2008/0144853 A1 * | 6/2008 | Sommerfeldt et al. | 381/71.11 |
| 2008/0177532 A1 | 7/2008 | Greiss et al. | |
| 2008/0181422 A1 * | 7/2008 | Christoph | 381/73.1 |
| 2008/0226098 A1 * | 9/2008 | Haulick et al. | 381/94.9 |
| 2008/0240413 A1 | 10/2008 | Mohammed et al. | |
| 2008/0240455 A1 * | 10/2008 | Inoue et al. | 381/71.4 |
| 2008/0240457 A1 * | 10/2008 | Inoue et al. | 381/71.4 |
| 2008/0269926 A1 | 10/2008 | Xiang et al. | |
| 2009/0012783 A1 | 1/2009 | Klein | |
| 2009/0034748 A1 * | 2/2009 | Sibbald | 381/71.6 |
| 2009/0041260 A1 * | 2/2009 | Jorgensen et al. | 381/71.6 |
| 2009/0046867 A1 * | 2/2009 | Clemow | 381/71.6 |
| 2009/0060222 A1 * | 3/2009 | Jeong et al. | 381/92 |
| 2009/0080670 A1 | 3/2009 | Solbeck et al. | |

(56) References Cited

U.S. PATENT DOCUMENTS

| | | | |
|---|---|---|---|
| 2009/0086990 A1* | 4/2009 | Christoph | 381/71.12 |
| 2009/0147965 A1* | 6/2009 | Kuo | 381/71.6 |
| 2009/0175466 A1 | 7/2009 | Elko et al. | |
| 2009/0185696 A1* | 7/2009 | Horibe et al. | 381/120 |
| 2009/0196429 A1 | 8/2009 | Ramakrishnan et al. | |
| 2009/0220107 A1 | 9/2009 | Every et al. | |
| 2009/0238369 A1* | 9/2009 | Ramakrishnan et al. | 381/56 |
| 2009/0245529 A1* | 10/2009 | Asada et al. | 381/71.6 |
| 2009/0254340 A1* | 10/2009 | Sun et al. | 704/226 |
| 2009/0290718 A1 | 11/2009 | Kahn et al. | |
| 2009/0296965 A1 | 12/2009 | Kojima | |
| 2009/0304200 A1 | 12/2009 | Kim et al. | |
| 2009/0311979 A1* | 12/2009 | Husted et al. | 455/102 |
| 2010/0002891 A1 | 1/2010 | Shiraishi et al. | |
| 2010/0014683 A1* | 1/2010 | Maeda et al. | 381/71.4 |
| 2010/0014685 A1* | 1/2010 | Wurm | 381/71.11 |
| 2010/0061564 A1* | 3/2010 | Clemow et al. | 381/71.6 |
| 2010/0069114 A1* | 3/2010 | Lee et al. | 455/556.1 |
| 2010/0082339 A1* | 4/2010 | Konchitsky et al. | 704/226 |
| 2010/0098263 A1* | 4/2010 | Pan et al. | 381/71.11 |
| 2010/0098265 A1 | 4/2010 | Pan et al. | |
| 2010/0124335 A1 | 5/2010 | Wessling et al. | |
| 2010/0124336 A1* | 5/2010 | Shridhar et al. | 381/71.4 |
| 2010/0124337 A1 | 5/2010 | Wertz et al. | |
| 2010/0131269 A1* | 5/2010 | Park et al. | 704/233 |
| 2010/0142715 A1 | 6/2010 | Goldstein et al. | |
| 2010/0150367 A1 | 6/2010 | Mizuno | |
| 2010/0158330 A1 | 6/2010 | Guissin et al. | |
| 2010/0166203 A1* | 7/2010 | Peissig et al. | 381/71.6 |
| 2010/0195838 A1 | 8/2010 | Bright | |
| 2010/0195844 A1* | 8/2010 | Christoph et al. | 381/71.11 |
| 2010/0207317 A1* | 8/2010 | Iwami et al. | 271/119 |
| 2010/0239126 A1 | 9/2010 | Grafenberg et al. | |
| 2010/0246855 A1* | 9/2010 | Chen | 381/107 |
| 2010/0260345 A1 | 10/2010 | Shridhar et al. | |
| 2010/0266137 A1 | 10/2010 | Sibbald et al. | |
| 2010/0272276 A1 | 10/2010 | Carreras et al. | |
| 2010/0272283 A1* | 10/2010 | Carreras et al. | 381/71.6 |
| 2010/0274564 A1* | 10/2010 | Bakalos et al. | 704/500 |
| 2010/0284546 A1* | 11/2010 | DeBrunner et al. | 381/71.2 |
| 2010/0291891 A1* | 11/2010 | Ridgers et al. | 455/205 |
| 2010/0296666 A1* | 11/2010 | Lin | 381/71.6 |
| 2010/0296668 A1* | 11/2010 | Lee et al. | 381/94.7 |
| 2010/0310086 A1* | 12/2010 | Magrath et al. | 381/71.11 |
| 2010/0322430 A1* | 12/2010 | Isberg | 381/58 |
| 2011/0007907 A1* | 1/2011 | Park et al. | 381/71.8 |
| 2011/0026724 A1 | 2/2011 | Doclo | |
| 2011/0106533 A1* | 5/2011 | Yu | 704/233 |
| 2011/0116654 A1 | 5/2011 | Chan et al. | |
| 2011/0129098 A1* | 6/2011 | Delano et al. | 381/71.6 |
| 2011/0130176 A1* | 6/2011 | Magrath et al. | 455/570 |
| 2011/0142247 A1* | 6/2011 | Fellers et al. | 381/71.1 |
| 2011/0144984 A1 | 6/2011 | Konchitsky | |
| 2011/0150257 A1* | 6/2011 | Jensen et al. | 381/318 |
| 2011/0158419 A1* | 6/2011 | Theverapperuma et al. | 381/71.1 |
| 2011/0206214 A1* | 8/2011 | Christoph et al. | 381/71.6 |
| 2011/0222698 A1 | 9/2011 | Asao et al. | |
| 2011/0249826 A1* | 10/2011 | Van Leest | 381/71.8 |
| 2011/0288860 A1* | 11/2011 | Schevciw et al. | 704/233 |
| 2011/0293103 A1* | 12/2011 | Park et al. | 381/57 |
| 2011/0299695 A1* | 12/2011 | Nicholson | 381/71.6 |
| 2011/0305347 A1* | 12/2011 | Wurm | 381/71.1 |
| 2011/0317848 A1* | 12/2011 | Ivanov et al. | 381/94.2 |
| 2012/0135787 A1* | 5/2012 | Kusunoki et al. | 455/575.8 |
| 2012/0140917 A1 | 6/2012 | Nicholson et al. | |
| 2012/0140942 A1* | 6/2012 | Loeda | 381/71.11 |
| 2012/0140943 A1* | 6/2012 | Hendrix et al. | 381/71.11 |
| 2012/0148062 A1* | 6/2012 | Scarlett et al. | 381/71.6 |
| 2012/0155666 A1* | 6/2012 | Nair | 381/71.6 |
| 2012/0170766 A1* | 7/2012 | Alves et al. | 381/71.11 |
| 2012/0207317 A1* | 8/2012 | Abdollahzadeh Milani et al. | 381/71.6 |
| 2012/0215519 A1* | 8/2012 | Park et al. | 704/2 |
| 2012/0250873 A1* | 10/2012 | Bakalos et al. | 381/71.6 |
| 2012/0259626 A1* | 10/2012 | Li et al. | 704/226 |
| 2012/0263317 A1 | 10/2012 | Shin et al. | |
| 2012/0281850 A1 | 11/2012 | Hyatt | |
| 2012/0300955 A1 | 11/2012 | Iseki et al. | |
| 2012/0300958 A1* | 11/2012 | Klemmensen | 381/81 |
| 2012/0300960 A1* | 11/2012 | Mackay et al. | 381/119 |
| 2012/0308021 A1* | 12/2012 | Kwatra et al. | 381/71.1 |
| 2012/0308024 A1* | 12/2012 | Alderson et al. | 381/71.11 |
| 2012/0308025 A1* | 12/2012 | Hendrix et al. | 381/71.11 |
| 2012/0308026 A1* | 12/2012 | Kamath et al. | 381/71.11 |
| 2012/0308027 A1* | 12/2012 | Kwatra | 381/71.11 |
| 2012/0308028 A1* | 12/2012 | Kwatra et al. | 381/71.11 |
| 2012/0310640 A1* | 12/2012 | Kwatra et al. | 704/233 |
| 2013/0010982 A1* | 1/2013 | Elko et al. | 381/94.2 |
| 2013/0083939 A1* | 4/2013 | Fellers et al. | 381/71.11 |
| 2013/0195282 A1 | 8/2013 | Ohita et al. | |
| 2013/0243198 A1 | 9/2013 | Van Rumpt | |
| 2013/0243225 A1* | 9/2013 | Yokota | 381/300 |
| 2013/0272539 A1* | 10/2013 | Kim et al. | 381/92 |
| 2013/0287218 A1 | 10/2013 | Alderson et al. | |
| 2013/0287219 A1 | 10/2013 | Hendrix et al. | |
| 2013/0301842 A1 | 11/2013 | Hendrix et al. | |
| 2013/0301846 A1 | 11/2013 | Alderson et al. | |
| 2013/0301847 A1 | 11/2013 | Alderson et al. | |
| 2013/0301848 A1 | 11/2013 | Zhou et al. | |
| 2013/0301849 A1 | 11/2013 | Alderson et al. | |
| 2013/0315403 A1 | 11/2013 | Samuelsson | |
| 2013/0343556 A1 | 12/2013 | Bright | |
| 2013/0343571 A1* | 12/2013 | Rayala et al. | 381/92 |
| 2014/0016803 A1 | 1/2014 | Puskarich | |
| 2014/0036127 A1 | 2/2014 | Pong et al. | |
| 2014/0044275 A1* | 2/2014 | Goldstein et al. | 381/71.6 |
| 2014/0050332 A1* | 2/2014 | Nielsen et al. | 381/92 |
| 2014/0072134 A1 | 3/2014 | Po et al. | |
| 2014/0086425 A1* | 3/2014 | Jensen et al. | 381/71.11 |
| 2014/0146976 A1 | 5/2014 | Rundle | |
| 2014/0169579 A1 | 6/2014 | Azmi | |
| 2014/0177851 A1* | 6/2014 | Kitazawa et al. | 381/56 |
| 2014/0211953 A1 | 7/2014 | Alderson et al. | |
| 2014/0270222 A1 | 9/2014 | Hendrix et al. | |
| 2014/0270223 A1 | 9/2014 | Li et al. | |
| 2014/0270224 A1 | 9/2014 | Zhou et al. | |
| 2014/0294182 A1 | 10/2014 | Axelsson et al. | |
| 2014/0307887 A1 | 10/2014 | Alderson | |
| 2014/0307888 A1 | 10/2014 | Alderson et al. | |
| 2014/0307890 A1 | 10/2014 | Zhou et al. | |
| 2014/0314244 A1 | 10/2014 | Yong et al. | |
| 2014/0314247 A1 | 10/2014 | Zhang | |
| 2014/0369517 A1 | 12/2014 | Zhou et al. | |
| 2015/0092953 A1 | 4/2015 | Abdollahzadeh Milani et al. | |
| 2015/0161981 A1 | 6/2015 | Kwatra | |

FOREIGN PATENT DOCUMENTS

| | | |
|---|---|---|
| EP | 1691577 A2 | 8/2006 |
| EP | 1880699 A2 | 1/2008 |
| EP | 1947642 A1 | 7/2008 |
| EP | 2133866 A1 | 12/2009 |
| EP | 2216774 A1 | 8/2010 |
| EP | 2237573 A1 | 10/2010 |
| EP | 2395500 A1 | 12/2011 |
| EP | 2395501 A1 | 12/2011 |
| EP | 2551845 A1 | 1/2013 |
| GB | 2401744 A | 11/2004 |
| GB | 2436657 A | 10/2007 |
| GB | 2455821 A | 6/2009 |
| GB | 2455824 A | 6/2009 |
| GB | 2455828 A | 6/2009 |
| GB | 2484722 A | 4/2012 |
| JP | H06-186985 A | 7/1994 |
| JP | 07104769 | 4/1995 |
| JP | 07240989 | 9/1995 |
| JP | 07325588 | 12/1995 |
| WO | WO 9113429 | 9/1991 |
| WO | WO 9911045 | 3/1999 |
| WO | WO 03/015074 A1 | 2/2003 |
| WO | WO 03015275 A1 | 2/2003 |
| WO | WO 2004009007 A1 | 1/2004 |
| WO | WO 2004017303 A1 | 2/2004 |
| WO | WO 2006128768 A1 | 12/2006 |

(56) References Cited

FOREIGN PATENT DOCUMENTS

| WO | WO 2007007916 A1 | 1/2007 |
|---|---|---|
| WO | WO 2007011337 | 1/2007 |
| WO | WO 2007110807 A2 | 10/2007 |
| WO | WO 2007113487 A1 | 11/2007 |
| WO | WO 2010117714 A1 | 10/2010 |
| WO | WO 2010131154 A1 | 11/2010 |
| WO | WO 2012134874 A1 | 10/2012 |
| WO | WO 2015038255 A1 | 3/2015 |

OTHER PUBLICATIONS

Parkins, et al., "Narrowband and broadband active control in an enclosure using the acoustic energy density", J. Acoust. Soc. Am. Jul. 2000, pp. 192-203, vol. 108, issue 1, US.
Feng, et al.., "A broadband self-tuning active noise equaliser", Signal Processing, Oct. 1, 1997, pp. 251-256, vol. 62, No. 2, Elsevier Science Publishers B.V. Amsterdam, NL.
Zhang, et al., "A Robust Online Secondary Path Modeling Method with Auxiliary Noise Power Scheduling Strategy and Norm Constraint Manipulation", IEEE Transactions on Speech and Audio Processing, IEEE Service Center, Jan. 1, 2003, pp. 45-53, vol. 11, No. 1, NY.
Lopez-Gaudana, et al., "A hybrid active noise cancelling with secondary path modeling", 51st Midwest Symposium on Circuits and Systems, MWSCAS 2008, Aug. 10-13, 2008, pp. 277-280, IEEE, Knoxville, TN.
International Search Report and Written Opinion in PCT/US2012/038510, mailed on Apr. 4, 2013, 12 pages (pp. 1-12 in pdf).
Written Opinion of the International Preliminary Examining Authority in PCT/US2012/038510, mailed on Oct. 16, 2013, 6 pages (pp. 1-6 in pdf).
International Preliminary Report on Patentability in PCT/US2012/038510, mailed on Jan. 21, 2014, 25 pages (pp. 1-25 in pdf).
Campbell, Mikey, "Apple looking into self-adjusting earbud headphones with noise cancellation tech", Apple Insider, Jul. 4, 2013, pp. 1-10 (10 pages in pdf), downloaded on May 14, 2014 from http://appleinsider.com/articles/13/07/04/apple-looking-into-self-adjusting-earbud-headphones-with-noise-cancellation-tech.
Jin, et al. "A simultaneous equation method-based online secondary path modeling algorithm for active noise control", Journal of Sound and Vibration, Apr. 25, 2007, pp. 455-474, vol. 303, No. 3-5, London, GB.
Erkelens, et al., "Tracking of Nonstationary Noise Based on Data-Driven Recursive Noise Power Estimation", IEEE Transactions on Audio Speech and Language Processing, Aug. 2008, pp. 1112-1123, vol. 16, No. 6, Piscataway, NJ, US.
Rao, et al., "A Novel Two State Single Channel Speech Enhancement Technique", India Conference (INDICON) 2011 Annual IEEE, IEEE, Dec. 2011, 6 pages (pp. 1-6 in pdf), Piscataway, NJ, US.
Rangachari, et al., "A noise-estimation algorithm for highly non-stationary environments", Speech Communication, Feb. 2006, pp. 220-231, vol. 48, No. 2. Elsevier Science Publishers.
Final Office Action in U.S. Appl. No. 13/249,711 mailed on Jul. 17, 2014, 44 pages (pp. 1-44 in pdf).
U.S. Appl. No. 14/029,159, filed Sep. 17, 2013, Li, et al.
U.S. Appl. No. 14/062,951, filed Oct. 25, 2013, Zhou, et al.
U.S. Appl. No. 13/795,160, filed Mar. 12, 2013, Hendrix, et al.
U.S. Appl. No. 13/692,367, filed Dec. 3, 2012, Alderson, et al.
U.S. Appl. No. 13/722,119, filed Dec. 20, 2012, Hendrix, et al.
U.S. Appl. No. 13/727,718, filed Dec. 27, 2012, Alderson, et al.
U.S. Appl. No. 13/784,018, filed Mar. 4, 2013, Alderson, et al.
U.S. Appl. No. 13/787,906, filed Mar. 7, 2013, Alderson, et al.
U.S. Appl. No. 13/729,141, filed Dec. 28, 2012, Zhou, et al.
U.S. Appl. No. 13/794,931, filed Mar. 12, 2013, Lu, et al.
U.S. Appl. No. 13/794,979, filed Mar. 12, 2013, Alderson, et al.
Pfann, et al., "LMS Adaptive Filtering with Delta-Sigma Modulated Input Signals," IEEE Signal Processing Letters, Apr. 1998, pp. 95-97, vol. 5, No. 4, IEEE Press, Piscataway, NJ.
Toochinda, et al. "A Single-Input Two-Output Feedback Formulation for ANC Problems," Proceedings of the 2001 American Control Conference, Jun. 2001, pp. 923-928, vol. 2, Arlington, VA.
Kuo, et al., "Active Noise Control: A Tutorial Review," Proceedings of the IEEE, Jun. 1999, pp. 943-973, vol. 87, No. 6, IEEE Press, Piscataway, NJ.
Johns, et al., "Continuous-Time LMS Adaptive Recursive Filters," IEEE Transactions on Circuits and Systems, Jul. 1991, pp. 769-778, vol. 38, No. 7, IEEE Press, Piscataway, NJ.
Shoval, et al., "Comparison of DC Offset Effects in Four LMS Adaptive Algorithms," IEEE Transactions on Circuits and Systems II: Analog and Digital Processing, Mar. 1995, pp. 176-185, vol. 42, Issue 3, IEEE Press, Piscataway, NJ.
Mali, Dilip, "Comparison of DC Offset Effects on LMS Algorithm and its Derivatives," International Journal of Recent Trends in Engineering, May 2009, pp. 323-328, vol. 1, No. 1, Academy Publisher.
Kates, James M., "Principles of Digital Dynamic Range Compression," Trends in Amplification, Spring 2005, pp. 45-76, vol. 9, No. 2, Sage Publications.
Gao, et al., "Adaptive Linearization of a Loudspeaker," IEEE International Conference on Acoustics, Speech, and Signal Processing, Apr. 14-17, 1991, pp. 3589-3592, Toronto, Ontario, CA.
Silva, et al., "Convex Combination of Adaptive Filters With Different Tracking Capabilities," IEEE International Conference on Acoustics, Speech, and Signal Processing, Apr. 15-20, 2007, pp. III 925-III 928, vol. 3, Honolulu, HI, USA.
Akhtar, et al., "A Method for Online Secondary Path Modeling in Active Noise Control Systems," IEEE International Symposium on Circuits and Systems, May 23-26, 2005, pp. 264-267, vol. 1, Kobe, Japan.
Davari, et al., "A New Online Secondary Path Modeling Method for Feedforward Active Noise Control Systems," IEEE International Conference on Industrial Technology, Apr. 21-24, 2008, pp. 1-6, Chengdu, China.
Lan, et al., "An Active Noise Control System Using Online Secondary Path Modeling With Reduced Auxiliary Noise," IEEE Signal Processing Letters, Jan. 2002, pp. 16-18, vol. 9, Issue 1, IEEE Press, Piscataway, NJ.
Liu, et al., "Analysis of Online Secondary Path Modeling With Auxiliary Noise Scaled by Residual Noise Signal," IEEE Transactions on Audio, Speech and Language Processing, Nov. 2010, pp. 1978-1993, vol. 18, Issue 8, IEEE Press, Piscataway, NJ.
U.S. Appl. No. 14/197,814, filed Mar. 5, 2014, Kaller, et al.
U.S. Appl. No. 14/210,537, filed Mar. 14, 2014, Abdollahzadeh Milani, et al.
U.S. Appl. No. 14/210,589, filed Mar. 14, 2014, Abdollahzadeh Milani, et al.
Black, John W., "An Application of Side-Tone in Subjective Tests of Microphones and Headsets", Project Report No. NM 001 064.01.20, Research Report of the U.S. Naval School of Aviation Medicine, Feb. 1, 1954, 12 pages (pp. 1-12 in pdf), Pensacola, FL, US.
Peters, Robert W., "The Effect of High-Pass and Low-Pass Filtering of Side-Tone Upon Speaker Intelligibility", Project Report No. NM 001 064.01.25, Research Report of the U.S. Naval School of Aviation Medicine, Aug. 16, 1954, 13 pages (pp. 1-13 in pdf), Pensacola, FL, US.
Lane, et al., "Voice Level: Autophonic Scale, Perceived Loudness, and the Effects of Sidetone", The Journal of the Acoustical Society of America, Feb. 1961, pp. 160-167, vol. 33, No. 2., Cambridge, MA, US.
Liu, et al., "Compensatory Responses to Loudness-shifted Voice Feedback During Production of Mandarin Speech", Journal of the Acoustical Society of America, Oct. 2007, pp. 2405-2412, vol. 122, No. 4.
Paepcke, et al., "Yelling in the Hall: Using Sidetone to Address a Problem with Mobile Remote Presence Systems", Symposium on User Interface Software and Technology, Oct. 16-19, 2011, 10 pages (pp. 1-10 in pdf), Santa Barbara, CA, US.
Therrien, et al., "Sensory Attenuation of Self-Produced Feedback: The Lombard Effect Revisited", PLOS ONE, Nov. 2012, pp. 1-7, vol. 7, Issue 11, e49370, Ontario, Canada.
Office Action in U.S. Appl. No. 13/249,711 mailed on Feb. 14, 2014, 44 pages (pp. 1-44 in pdf).

(56) References Cited

OTHER PUBLICATIONS

U.S. Appl. No. 14/228,322, filed Mar. 28, 2014, Alderson, et al.
U.S. Appl. No. 13/762,504, filed Feb. 8, 2013, Abdollahzadeh Milani, et al.
U.S. Appl. No. 13/721,832, filed Dec. 20, 2012, Lu, et al.
U.S. Appl. No. 13/724,656, filed Dec. 21, 2012, Lu, et al.
U.S. Appl. No. 14/252,235, filed Apr. 14, 2014, Lu, et al.
U.S. Appl. No. 13/968,013, filed Aug. 15, 2013, Abdollahzadeh Milani, et al.
U.S. Appl. No. 13/924,935, filed Jun. 24, 2013, Hellman.
U.S. Appl. No. 13/896,526, filed May 17, 2013, Naderi.
U.S. Appl. No. 14/101,955, filed Dec. 10, 2013, Alderson.
U.S. Appl. No. 14/101,777, filed Dec. 10, 2013, Alderson et al.
Abdollahzadeh Milani, et al., "On Maximum Achievable Noise Reduction in ANC Systems", 2010 IEEE International Conference on Acoustics Speech and Signal Processing, Mar. 14-19, 2010, pp. 349-352, Dallas, TX, US.
Cohen, Israel, "Noise Spectrum Estimation in Adverse Environments: Improved Minima Controlled Recursive Averaging", IEEE Transactions on Speech and Audio Processing, Sep. 2003, pp. 1-11, vol. 11, Issue 5, Piscataway, NJ, US.
Ryan, et al., "Optimum Near-Field Performance of Microphone Arrays Subject to a Far-Field Beampattern Constraint", J. Acoust. Soc. Am., Nov. 2000, pp. 2248-2255, 108 (5), Pt. 1, Ottawa, Ontario, Canada.
Cohen, et al., "Noise Estimation by Minima Controlled Recursive Averaging for Robust Speech Enhancement", IEEE Signal Processing Letters, Jan. 2002, pp. 12-15, vol. 9, No. 1, Piscataway, NJ, US.
Martin, Rainer, "Noise Power Spectral Density Estimation Based on Optimal Smoothing and Minimum Statistics", IEEE Transactions on Speech and Audio Processing, Jul. 2001, pp. 504-512, vol. 9, No. 5, Piscataway, NJ, US.
Martin, Rainer, "Spectral Subtraction Based on Minimum Statistics", Signal Processing VII Theories and Applications, Proceedings of EUSIPCO-94, 7th European Signal Processing Conference, Sep. 13-16, 1994, pp. 1182-1185, vol. III, Edinburgh, Scotland, U.K.
Booij, et al., "Virtual sensors for local, three dimensional, broadband multiple-channel active noise control and the effects on the quiet zones", Proceedings of the International Conference on Noise and Vibration Engineering, ISMA 2010, Sep. 20-22, 2010, pp. 151-166, Leuven.
Kuo, et al., "Residual noise shaping technique for active noise control systems", J. Acoust. Soc. Am. 95 (3), Mar. 1994, pp. 1665-1668.
Lopez-Caudana, Edgar Omar, "Active Noise Cancellation: The Unwanted Signal and the Hybrid Solution", Adaptive Filtering Applications, Dr. Lino Garcia (Ed.), Jul. 2011, pp. 49-84, ISBN: 978-953-307-306-4, InTech.
Senderowicz, et al., "Low-Voltage Double-Sampled Delta-Sigma Converters", IEEE Journal on Solid-State Circuits, Dec. 1997, pp. 1907-1919, vol. 32, No. 12, Piscataway, NJ.
Hurst, et al., "An improved double sampling scheme for switched-capacitor delta-sigma modulators", 1992 IEEE Int. Symp. on Circuits and Systems, May 10-13, 1992, vol. 3, pp. 1179-1182, San Diego, CA.
U.S. Appl. No. 14/578,567, filed Dec. 22, 2014, Kwatra, et al.
Widrow, B., et al., Adaptive Noise Cancelling; Principles and Applications, Proceedings of the IEEE, Dec. 1975, pp. 1692-1716, vol. 63, No. 13, IEEE, New York, NY, US.
Morgan, et al., A Delayless Subband Adaptive Filter Architecture, IEEE Transactions on Signal Processing, IEEE Service Center, Aug. 1995, pp. 1819-1829, vol. 43, No. 8, New York, NY, US.
U.S. Appl. No. 14/656,124, filed Mar. 12, 2015, Hendrix, et al.
U.S. Appl. No. 14/734,321, filed Jun. 9, 2015, Alderson, et al.
U.S. Appl. No. 14/840,831, filed Aug. 31, 2015, Hendrix, et al.
Rafaely, Boaz, "Active Noise Reducing Headset—an Overview", The 2001 International Congress and Exhibition on Noice Control Engineering, Aug. 27-30, 2001, 10 pages (pp. 1-10 in pdf), The Netherlands.
Ray, et al., "Hybrid Feedforward-Feedback Active Noise Reduction for Hearing Protection and Communication", The Journal of the Acoustical Society of America, American Institute of Physics for the Acoustical Society of America, Jan. 2006, pp. 2026-2036, vol. 120, No. 4, New York, NY.

\* cited by examiner

SIDETONE MANAGEMENT IN AN ADAPTIVE NOISE CANCELING (ANC) SYSTEM INCLUDING SECONDARY PATH MODELING

This application is a Continuation-in-Part of U.S. patent application Ser. No. 13/249,711 filed on Sep. 30, 2011, having at least one common inventor and assigned to the same Assignee. The specification of the above-referenced parent U.S. Patent Application is incorporated herein by reference.

BACKGROUND OF THE INVENTION

1. Field of the Invention

The present invention relates generally to wireless telephones that include noise canceling, and, more specifically, to a wireless telephone device in which secondary path modeling forms part of the noise canceling system.

2. Background of the Invention

Wireless telephones, such as mobile/cellular telephones, cordless telephones, and other consumer audio devices that provide two-way voice communications functionality, such as some tablet computers, are in widespread use. Performance of such devices with respect to intelligibility can be improved by providing adaptive noise canceling (ANC) using a microphone to measure ambient acoustic events and then using signal processing to insert an anti-noise signal into the output of the device to cancel the ambient acoustic events.

ANC operation can be improved by measuring the transducer output of a device at the transducer to determine the effectiveness of the noise canceling using an error microphone. The measured output of the transducer is ideally the source audio, e.g., downlink audio in a telephone and/or playback audio in either a dedicated audio player or a telephone, since the noise canceling signal(s) are ideally canceled by the ambient noise at the location of the transducer. To remove the source audio from the error microphone signal, the secondary path from the transducer through the error microphone can be estimated and used to filter the source audio to the correct phase and amplitude for subtraction from the error microphone signal. The output of the transducer contains reproduced downlink speech and/or other program material and in the case of a telephone conversation, a portion of the near-end speech so that a user hears their own voice in proper relation to the telephone conversation. The portion of the near-end speech that is injected in the transducer output signal is referred to as sidetone and contains ambient noise, as well. The output of the transducer also includes the anti-noise signal, which, unless the sidetone information is properly managed, can cause cancelation of the side-tone and/or instability or improper adaptation of the ANC system due to the presence of ambient noise in the sidetone signal. In particular, the secondary path estimate described above can be frustrated by the additional path from the ambient acoustic environment, through the near-end speech microphone and out through the transducer, due to the requirement to inject sidetone during a telephone conversation.

Therefore, it would be desirable to provide techniques for managing sidetone in an ANC system having secondary path modeling.

SUMMARY OF THE INVENTION

The above stated objective of providing a wireless telephone providing ANC and including a secondary path estimate that properly manages sidetone to avoid improper or unstable operation of the ANC system, is accomplished in a wireless telephone, a method of operation, and an integrated circuit.

The wireless telephone includes a housing, with a transducer mounted on the housing for reproducing an audio signal that includes both source audio for providing to a listener and an anti-noise signal for countering the effects of ambient audio sounds in an acoustic output of the transducer. A reference microphone is mounted on the housing to provide a reference microphone signal indicative of the ambient audio sounds. The wireless telephone further includes an adaptive noise-canceling (ANC) processing circuit within the housing for adaptively generating an anti-noise signal from the reference microphone signal such that the anti-noise signal causes substantial cancellation of the ambient audio sounds. An error microphone is included for controlling the adaptation of the anti-noise signal to cancel the ambient audio sounds and for correcting for the secondary (electro-acoustical) path from the output of the processing circuit through the transducer by estimating the secondary path and using the resulting model of the secondary path in the generation of the anti-noise signal. The ANC processing circuit prevents improper adaptation of the secondary path estimate due to sidetone injection by providing only the downlink audio and other program information to the circuit that controls adaptation of the secondary path estimate, while providing the sidetone combined with the downlink audio and other program information to the transducer.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses noise canceling techniques and circuits that can be implemented in a personal audio device, such as a wireless telephone. The personal audio device includes an adaptive noise canceling (ANC) circuit that measures the ambient acoustic environment and generates a signal that is injected into the speaker (or other transducer) output to cancel ambient acoustic events. A reference microphone is provided to measure the ambient acoustic environment, and an error microphone is included to measure the ambient audio and transducer output at the transducer, thus giving an indication of the effectiveness of the noise cancelation. A secondary path estimating adaptive filter is used to remove the playback audio from the error microphone signal, in order to generate an error signal. Sidetone information is injected in the transducer output to provide a proper user perception of the user's own (uplink) speech, but is not provided to the coefficient control of the secondary path estimating adaptive filter, so that improper or unstable adaptation of the secondary path due to the presence of ambient noise in the sidetone information is prevented.

Figure 1:
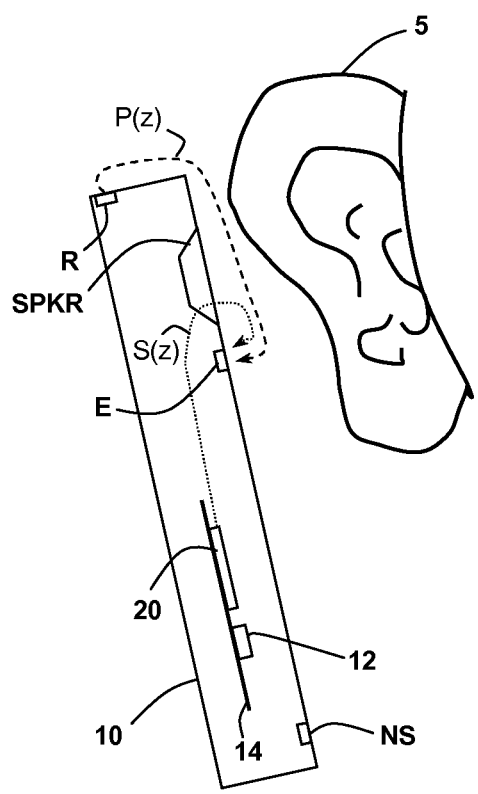
FIG. 1 is an illustration of a wireless telephone 10.

FIG. 1 shows a wireless telephone 10 in proximity to a human ear 5. Illustrated wireless telephone 10 is an example of a device in which techniques in accordance with the following disclosure may be employed, but it is understood that not all of the elements or configurations embodied in illustrated wireless telephone 10, or in the circuits depicted in subsequent illustrations, are required. Wireless telephone 10 includes a transducer such as speaker SPKR that reproduces distant speech received by wireless telephone 10, along with other local audio event such as ringtones, stored audio program material, injection of near-end speech (i.e., the speech of the user of wireless telephone 10) to provide a balanced conversational perception, and other audio that requires reproduction by wireless telephone 10, such as sources from web-pages or other network communications received by wireless telephone 10 and audio indications such as battery low and other system event notifications. A near-speech microphone NS is provided to capture near-end speech, which is transmitted from wireless telephone 10 to the other conversation participant(s).

Wireless telephone 10 includes adaptive noise canceling (ANC) circuits and features that inject an anti-noise signal into speaker SPKR to improve intelligibility of the distant speech and other audio reproduced by speaker SPKR. A reference microphone R is provided for measuring the ambient acoustic environment and is positioned away from the typical position of a user's mouth, so that the near-end speech is minimized in the signal produced by reference microphone R. A third microphone, error microphone E, is provided in order to further improve the ANC operation by providing a measure of the ambient audio combined with the audio reproduced by speaker SPKR close to ear 5, when wireless telephone 10 is in close proximity to ear 5. Exemplary circuit 14 within wireless telephone 10 includes an audio CODEC integrated circuit 20 that receives the signals from reference microphone R, near speech microphone NS, and error microphone E and interfaces with other integrated circuits such as an RF integrated circuit 12 containing the wireless telephone transceiver. In other embodiments of the invention, the circuits and techniques disclosed herein may be incorporated in a single integrated circuit that contains control circuits and other functionality for implementing the entirety of the personal audio device, such as an MP3 player-on-a-chip integrated circuit.

In general, the ANC techniques disclosed herein measure ambient acoustic events (as opposed to the output of speaker SPKR and/or the near-end speech) impinging on reference microphone R, and by also measuring the same ambient acoustic events impinging on error microphone E, the ANC processing circuits of illustrated wireless telephone 10 adapt an anti-noise signal generated from the output of reference microphone R to have a characteristic that minimizes the amplitude of the ambient acoustic events present at error microphone E. Since acoustic path $P(z)$ extends from reference microphone R to error microphone E, the ANC circuits are essentially estimating acoustic path $P(z)$ combined with removing effects of an electro-acoustic path $S(z)$. Electro-acoustic path $S(z)$ represents the response of the audio output circuits of CODEC IC 20 and the acoustic/electric transfer function of speaker SPKR including the coupling between speaker SPKR and error microphone E in the particular acoustic environment. Path $S(z)$ is affected by the proximity and structure of ear 5 and other physical objects and human head structures that may be in proximity to wireless telephone 10, when wireless telephone is not firmly pressed to ear 5. While the illustrated wireless telephone 10 includes a two microphone ANC system with a third near speech microphone NS, systems that do not include separate error and reference microphones, or in which a wireless telephone uses near speech microphone NS to perform the function of the reference microphone R, may alternatively be implemented. Also, in personal audio devices designed only for audio playback, near speech microphone NS will generally not be included, and the near-speech signal paths in the circuits described in further detail below can be omitted, without changing the fundamental operation of the system.

Figure 2:
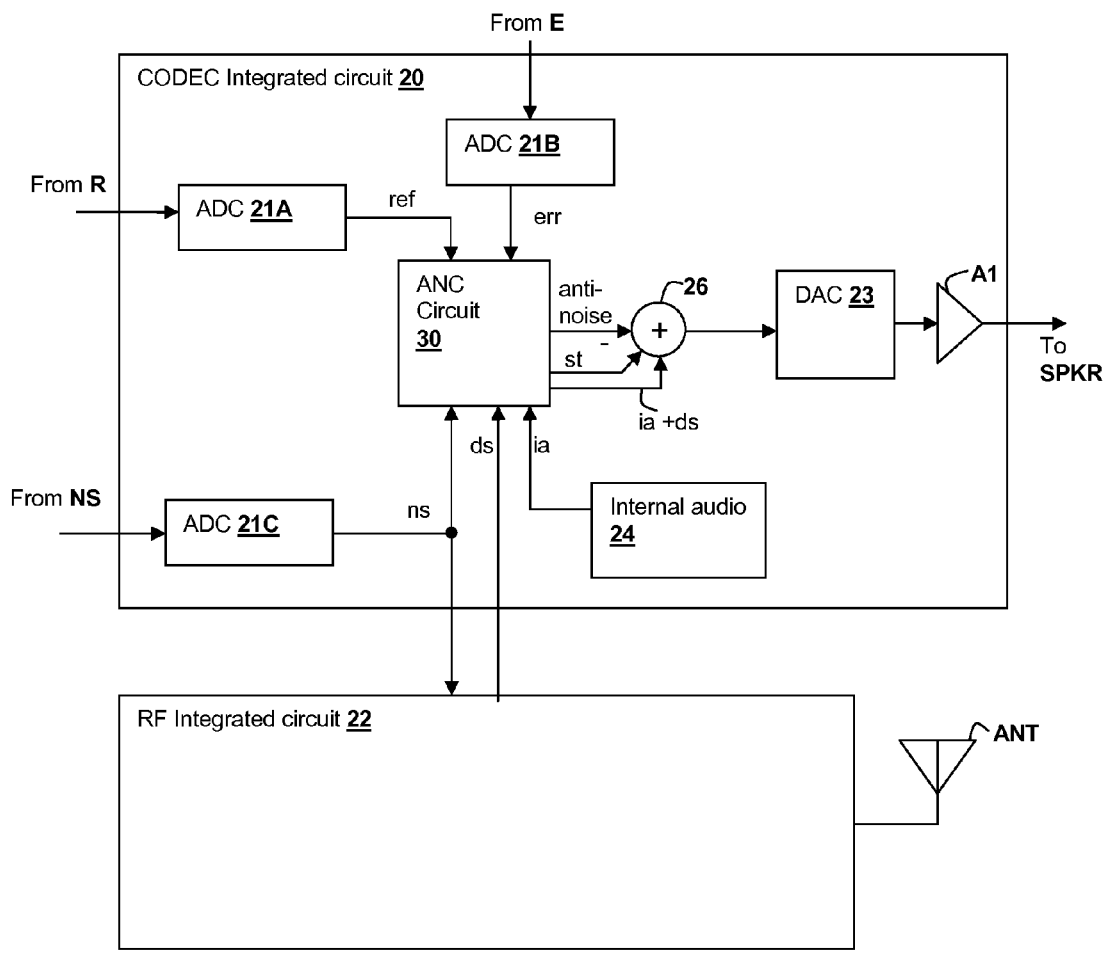
FIG. 2 is a block diagram of circuits within wireless telephone 10.

Referring now to FIG. 2, circuits within wireless telephone 10 are shown in a block diagram. CODEC integrated circuit 20 includes an analog-to-digital converter (ADC) 21A for receiving the reference microphone signal and generating a digital representation ref of the reference microphone signal, an ADC 21B for receiving the error microphone signal and generating a digital representation err of the error microphone signal, and an ADC 21C for receiving the near speech microphone signal and generating a digital representation ns of the error microphone signal. CODEC IC 20 generates an output for driving speaker SPKR from an amplifier A1, which amplifies the output of a digital-to-analog converter (DAC) 23 that receives the output of a combiner 26. Combiner 26 combines audio signals is from internal audio sources 24, the anti-noise signal anti-noise generated by ANC circuit 30, which by convention has the same polarity as the noise in reference microphone signal ref and is therefore subtracted by combiner 26, an attenuated portion of near speech signal ns, i.e., sidetone information st, so that the user of wireless telephone 10 hears their own voice in proper relation to downlink speech ds, which is received from radio frequency (RF) integrated circuit 22. Near speech signal ns is also provided to RF integrated circuit 22 and is transmitted as uplink speech to the service provider via antenna ANT.

Figure 3:
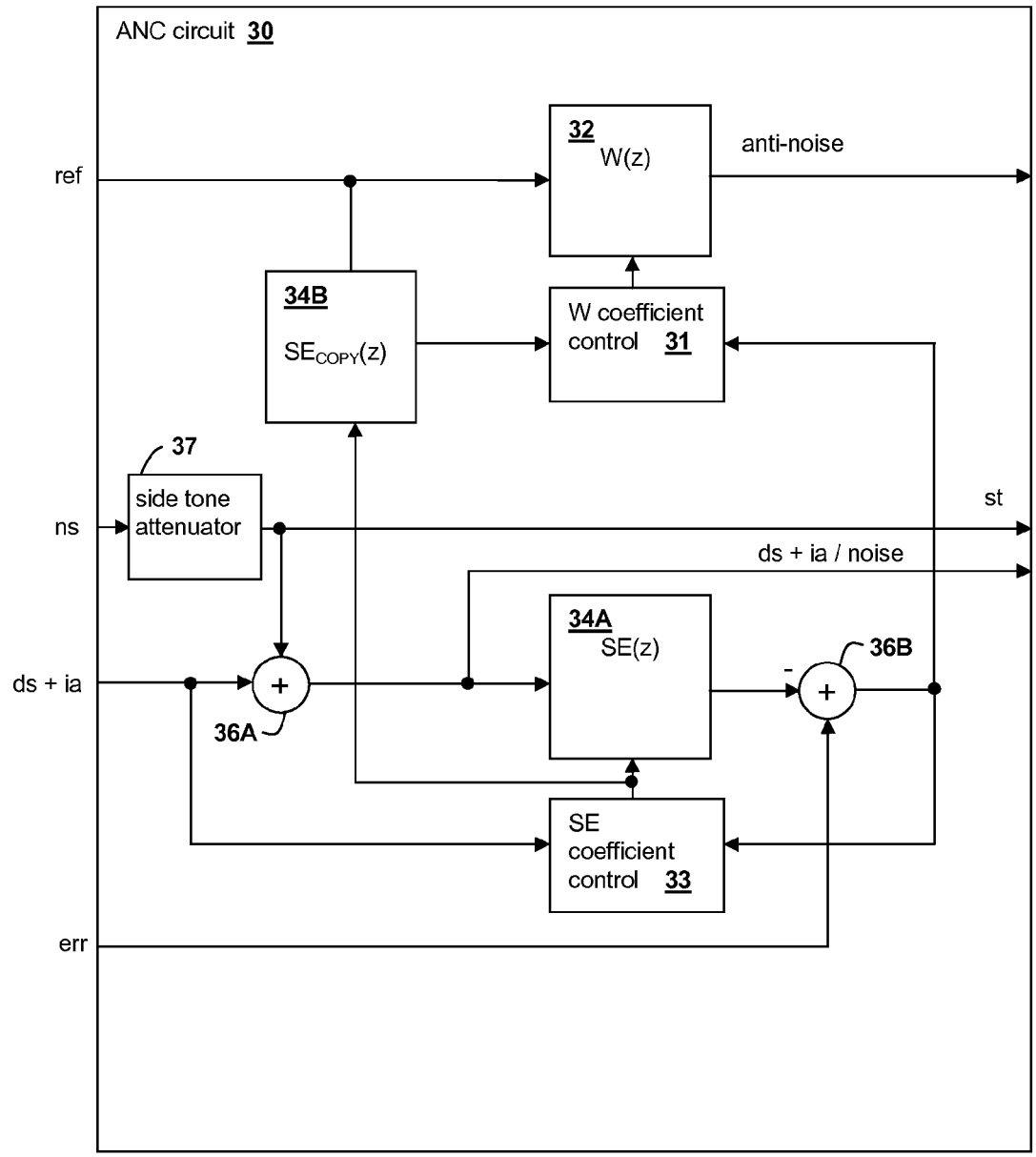
FIG. 3 is a block diagram depicting signal processing circuits and functional blocks within ANC circuit 30 of CODEC integrated circuit 20 of FIG. 2.

Referring now to FIG. 3, details of ANC circuit 30 are shown. An adaptive filter 32 receives reference microphone signal ref and under ideal circumstances, adapts its transfer function $W(z)$ to be $P(z)/S(z)$ to generate the anti-noise signal anti-noise, which is provided to an output combiner that combines the anti-noise signal with the audio to be reproduced by the transducer, as exemplified by combiner 26 of FIG. 2. The coefficients of adaptive filter 32 are controlled by a W coefficient control block 31 that uses a correlation of two signals to determine the response of adaptive filter 32, which generally minimizes the error, in a least-mean squares sense, between those components of reference microphone signal ref present in error microphone signal err. The signals processed by W coefficient control block 31 are the reference microphone signal ref as shaped by a copy of an estimate of the response of path $S(z)$ provided by filter 34B and another signal that includes error microphone signal err. By transforming reference microphone signal ref with a copy of the estimate of the response of path $S(z)$, response $SE_{COPY}(z)$, and minimizing error microphone signal err after removing components of error microphone signal err due to playback of source audio, adaptive filter 32 adapts to the desired response of $P(z)/S(z)$. In addition to error microphone signal err, the other signal processed along with the output of filter 34B by W coefficient control block 31 includes an inverted amount of the source audio including downlink audio signal ds, internal audio ia, and a portion of near speech signal ns attenuated by a side tone attenuator 37, which is provided from a combiner 36A. The output of combiner 36A is processed by a filter 34A having response $SE(z)$, of which response $SE_{COPY}(z)$ is a copy. By injecting an inverted amount of source audio and sidetone, adaptive filter 32 is prevented from adapting to the relatively large amount of source audio and the sidetone information (along with extra ambient noise information in the sidetone) present in error microphone signal err and by transforming the inverted copy of downlink audio signal ds and internal audio ia with the estimate of the response of path S(z), the source audio and sidetone that is removed from error microphone signal err before processing should match the expected version of downlink audio signal ds, and internal audio ia reproduced at error microphone signal err, since the electrical and acoustical path of S(z) is the path taken by downlink audio signal ds, internal audio ia and sidetone information to arrive at error microphone E. Filter 34B is not an adaptive filter, per se, but has an adjustable response that is tuned to match the response of adaptive filter 34A, so that the response of filter 34B tracks the adapting of adaptive filter 34A.

To implement the above, adaptive filter 34A has coefficients controlled by SE coefficient control block 33. Adaptive filter 34A processes the source audio (ds+ia) and sidetone information, to provide a signal representing the expected source audio delivered to error microphone E. Adaptive filter 34A is thereby adapted to generate a signal from downlink audio signal ds, internal audio ia and sidetone information st, that when subtracted from error microphone signal err, forms an error signal e containing the content of error microphone signal err that is not due to source audio (ds+ia) and the sidetone information st. A combiner 36B removes the filtered source audio (ds+ia) and sidetone information from error microphone signal err to generate the above-described error signal e.

Figure 4:
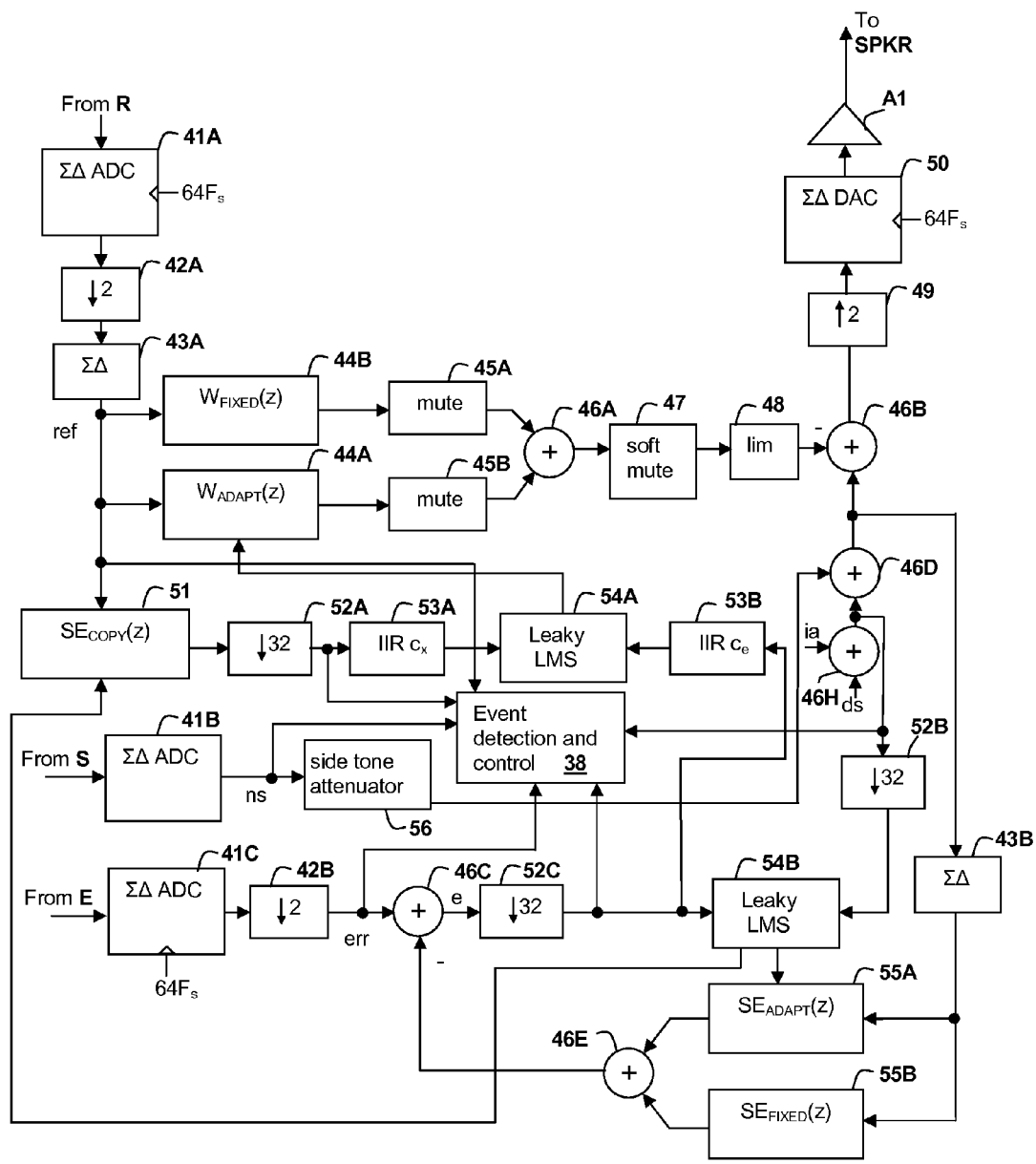
FIG. 4 is a block diagram depicting signal processing circuits and functional blocks within an integrated circuit.

Referring now to FIG. 4, a block diagram of an ANC system is shown for illustrating ANC techniques as may be implemented within CODEC integrated circuit 20. Reference microphone signal ref is generated by a delta-sigma ADC 41A that operates at 64 times oversampling and the output of which is decimated by a factor of two by a decimator 42A to yield a 32 times oversampled signal. A delta-sigma shaper 43A spreads the energy of images outside of bands in which a resultant response of a parallel pair of filter stages 44A and 44B will have significant response. Filter stage 44B has a fixed response $W_{FIXED}(z)$ that is generally predetermined to provide a starting point at the estimate of P(z)/S(z) for the particular design of wireless telephone 10 for a typical user. An adaptive portion $W_{ADAPT}(z)$ of the response of the estimate of P(z)/S(z) is provided by adaptive filter stage 44A, which is controlled by a leaky least-means-squared (LMS) coefficient controller 54A. Leaky LMS coefficient controller 54A is leaky in that the response normalizes to flat or otherwise predetermined response over time when no error input is provided to cause leaky LMS coefficient controller 54A to adapt. Providing a leaky controller prevents long-term instabilities that might arise under certain environmental conditions, and in general makes the system more robust against particular sensitivities of the ANC response.

In the system depicted in FIG. 4, the reference microphone signal is filtered by a copy $SE_{COPY}(z)$ of the estimate of the response of path S(z), by a filter 51 that has a response $SE_{COPY}(z)$, the output of which is decimated by a factor of 32 by a decimator 52A to yield a baseband audio signal that is provided, through an infinite impulse response (IIR) filter 53A to leaky LMS 54A. Filter 51 is not an adaptive filter, per se, but has an adjustable response that is tuned to match the combined response of filter stages 55A and 55B, so that the response of filter 51 tracks the adapting of response SE(z). The error microphone signal err is generated by a delta-sigma ADC 41C that operates at 64 times oversampling and the output of which is decimated by a factor of two by a decimator 42B to yield a 32 times oversampled signal. As in the system of FIG. 3, an amount of source audio (ds+ia) that has been filtered by an adaptive filter to apply response S(z) is removed from error microphone signal err by a combiner 46C, the output of which is decimated by a factor of 32 by a decimator 52C to yield a baseband audio signal that is provided, through an infinite impulse response (IIR) filter 53B to leaky LMS 54A. Response S(z) is produced by another parallel set of filter stages 55A and 55B, one of which, filter stage 55B has fixed response $SE_{FIXED}(z)$, and the other of which, filter stage 55A has an adaptive response $SE_{ADAPT}(z)$ controlled by leaky LMS coefficient controller MB. The outputs of filter stages 55A and 55B are combined by a combiner 46E. Similar to the implementation of filter response W(z) described above, response $SE_{FIXED}(z)$ is generally a predetermined response known to provide a suitable starting point under various operating conditions for electrical/acoustical path S(z). Filter 51 is a copy of adaptive filter 55A/55B, but is not itself an adaptive filter, i.e., filter 51 does not separately adapt in response to its own output, and filter 51 can be implemented using a single stage or a dual stage. A separate control value is provided in the system of FIG. 4 to control the response of filter 51, which is shown as a single adaptive filter stage. However, filter 51 could alternatively be implemented using two parallel stages and the same control value used to control adaptive filter stage 55A could then be used to control the adjustable filter portion in the implementation of filter 51.

As in ANC circuit 30 of FIG. 3, the input to filter stages 55A and 55B is provided from source audio (ds+ia), which is provided to the input of a combiner 46D that adds a portion of near-end microphone signal ns, i.e., the sidetone information, that has been generated by sigma-delta ADC 41B and filtered by a sidetone attenuator 56 to prevent feedback conditions. The output of combiner 46D is shaped by a sigma-delta shaper 43B that provides inputs to filter stages 55A and 55B that has been shaped to shift images outside of bands where filter stages 55A and 55B will have significant response. The inputs to leaky LMS control block 54B are also at baseband, provided by decimating a combination of the source audio (ds+ia) from the output of a combiner 46H, by a decimator 52B that decimates by a factor of 32, and another input is provided by decimating error signal e provided by the output of a combiner 46C that has removed the signal generated from the combined outputs of adaptive filter stage 55A and filter stage 55B that are combined by another combiner 46E from error microphone signal err. As mentioned above, only the source audio (ds+ia), which is combined by combiner 46H, is provided to the input of decimator 52B so that sidetone is not injected into leaky LMS control block 54B, while the sidetone information is present in the signal provided to sigma-delta shaper 43B so that the sidetone is removed from the error signal generated by combiner 46C and used in the generation of the anti-noise signal. The output of combiner 46C represents error microphone signal err with the components due to source audio (ds+ia) and sidetone removed, which is provided to LMS control block 54B after decimation by decimator 52C. The other input to LMS control block 54B is the baseband signal produced by decimator 52B. The above arrangement of baseband and oversampled signaling provides for simplified control and reduced power consumed in the adaptive control blocks, such as leaky LMS controllers 54A and 54B, while providing the tap flexibility afforded by implementing adaptive filter stages 44A-44B, 55A-55B and filter 51 at the oversampled rates.

The output of combiner 46D is also combined with the output of adaptive filter stages 44A-44B that have been processed by a control chain that includes a corresponding hard mute block 45A, 45B for each of the filter stages, a combiner 46A that combines the outputs of hard mute blocks 45A, 45B, a soft mute 47 and then a soft limiter 48 to produce the anti-noise signal that is subtracted by a combiner 46B with the source audio output of combiner 46D. The output of combiner 46B is interpolated up by a factor of two by an interpolator 49 and then reproduced by a sigma-delta DAC 50 operated at the 64× oversampling rate. The output of DAC 50 is provided to amplifier A1, which generates the signal delivered to speaker SPKR.

Each or some of the elements in the system of FIG. 4, as well as in the exemplary circuits of FIG. 2 and FIG. 3, can be implemented directly in logic, or by a processor such as a digital signal processing (DSP) core executing program instructions that perform operations such as the adaptive filtering and LMS coefficient computations. While the DAC and ADC stages are generally implemented with dedicated mixed-signal circuits, the architecture of the ANC system of the present invention will generally lend itself to a hybrid approach in which logic may be, for example, used in the highly oversampled sections of the design, while program code or microcode-driven processing elements are chosen for the more complex, but lower rate operations such as computing the taps for the adaptive filters and/or responding to detected changes in ear pressure as described herein.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A wireless telephone, comprising:
   a housing;
   a transducer mounted on the housing for reproducing an audio signal including combined downlink audio and sidetone for playback to a listener and an anti-noise signal for countering the effects of ambient audio sounds in an acoustic output of the transducer;
   a reference microphone mounted on the housing for providing a reference microphone signal indicative of the ambient audio sounds;
   an error microphone mounted on the housing in proximity to the transducer for providing an error microphone signal indicative of the acoustic output of the transducer and the ambient audio sounds at the transducer;
   a near-speech microphone mounted on the housing for providing a near-speech microphone signal indicative of speech of the listener and the ambient audio sounds; and
   a processing circuit that generates the anti-noise signal from the reference microphone signal to reduce the presence of the ambient audio sounds heard by the listener in conformity with an error signal and the reference microphone signal, wherein the processing circuit generates sidetone from a portion of the near-speech microphone signal, wherein the processing circuit combines the downlink audio with the sidetone, wherein the processing circuit implements a secondary path adaptive filter having a secondary path response that shapes the combined downlink audio and sidetone and a combiner that removes an output of the secondary path adaptive filter from the error microphone signal to provide the error signal, wherein the secondary path adaptive filter is controlled by a secondary path coefficient controller that compares the error signal with the downlink audio and adapts to minimize components of the downlink audio present in the error signal but does not minimize components of the sidetone, so that the anti-noise signal is not affected by the ambient audio sounds present in the near-speech microphone signal.

2. The wireless telephone of claim 1, wherein the processing circuit further implements a primary adaptive filter that generates the anti-noise signal from the reference microphone signal.

3. The wireless telephone of claim 2, wherein the processing circuit further implements a copy of the secondary path adaptive filter that filters the reference microphone signal to provide a correlation input to the primary adaptive filter that is correlated with the error signal to control the adapting of the adaptive filter, wherein the processing circuit adapts the primary adaptive filter to minimize components of the error signal that are correlated with an output of the copy of the secondary path adaptive filter.

4. The wireless telephone of claim 1, wherein the processing circuit comprises:
   a coefficient control block that controls coefficients of the secondary path adaptive filter;
   a first combiner that combines the sidetone with the downlink audio; and
   a second combiner that combines an output of the first combiner with the anti-noise signal to generate the audio signal reproduced by the transducer, wherein a signal input of the secondary path adaptive filter receives the output of the first combiner.

5. The wireless telephone of claim 4, further comprising a third combiner for combining the downlink audio signal with internal source audio of the wireless telephone and wherein an output of the third combiner is provided to an input of the first combiner and to a correlation input of the coefficient control block.

6. The wireless telephone of claim 4, further comprising a sigma-delta noise-shaper having an input coupled to the output of the first combiner and an output coupled to the signal input of the secondary path adaptive filter.

7. The wireless telephone of claim 4, wherein the coefficient control block is a least-means-square control block.

8. A method of canceling ambient audio sounds in the proximity of a transducer of a personal audio device, the method comprising:
   first measuring ambient audio sounds with a reference microphone to produce a reference microphone signal;
   second measuring an output of the transducer and the ambient audio sounds at the transducer with an error microphone;
   third measuring near-end speech and the ambient audio sounds with a near-speech microphone to produce a near-speech microphone signal;
   adaptively generating an anti-noise signal from a result of the first measuring, the second measuring and the third measuring, for countering the effects of ambient audio sounds at an acoustic output of the transducer;
   first combining the anti-noise signal with a source audio signal and a portion of the near-speech microphone signal to generate an audio signal provided to the transducer;
   shaping a result of the first combining with a secondary path response;
   removing the result of the shaping the result of the first combining with the error microphone signal to produce an error signal indicative of the combined anti-noise and ambient audio sounds delivered to the listener;
   controlling the secondary path response by comparing the error signal with the downlink audio to generate coefficients of the secondary path response; and
   adapting the secondary response to minimize components of the source audio present in the error signal, but so as not to minimize components of the near-speech microphone signal, so that the anti-noise signal is not affected by the ambient audio sounds present in the near-speech microphone signal.

9. The method of claim 8, wherein the adapting adapts a response of a primary adaptive filter that generates the anti-noise signal from the reference microphone signal.

10. The method of claim 9, wherein the adapting further comprising filtering the reference microphone signal with a copy of the secondary path adaptive filter to provide a correlation input to the primary adaptive filter, and correlating the correlation input with the error signal, wherein the adapting adapts the primary adaptive filter to minimize components of the error signal that are correlated with an output of the copy of the secondary path adaptive filter.

11. The method of claim 8, wherein the shaping comprises controlling coefficients of the secondary path adaptive filter using a coefficient control block, and further comprising second combining the sidetone with the downlink audio, wherein the first combining combines a result of the first combining with the anti-noise signal to generate the audio signal reproduced by the transducer, wherein a signal input of the secondary path adaptive filter receives the result of the second combining.

12. The method of claim 11, further comprising third combining the downlink audio signal with internal source audio of the wireless telephone, wherein a result of the third combining is provided as an input to the second combining, and wherein the coefficient control block also receives the result of the third combining as a correlation input.

13. The method of claim 11, further comprising noise-shaping the result of the second combining with a sigma-delta noise-shaper and providing a result of the noise-shaping as a signal input to the shaping.

14. The method of claim 11, wherein the coefficient control block is a least-means-square control block.

15. An integrated circuit for implementing at least a portion of a personal audio device, comprising:
   an output for providing a signal to a transducer including both source audio for playback to a listener and an anti-noise signal for countering the effects of ambient audio sounds in an acoustic output of the transducer;
   a reference microphone input for receiving a reference microphone signal indicative of the ambient audio sounds;
   an error microphone input for receiving an error microphone signal indicative of the acoustic output of the transducer and the ambient audio sounds at the transducer;
   a near-speech microphone input for providing a near-speech microphone signal indicative of speech of the listener and the ambient audio sounds; and
   a processing circuit that generates the anti-noise signal from the reference microphone signal to reduce the presence of the ambient audio sounds heard by the listener in conformity with an error signal and the reference microphone signal, wherein the processing circuit generates sidetone from a portion of the near-speech microphone signal, wherein the processing circuit combines the downlink audio with the sidetone, wherein the processing circuit implements a secondary path adaptive filter having a secondary path response that shapes the combined downlink audio and sidetone and a combiner that removes an output of the secondary path adaptive filter from the error microphone signal to provide the error signal, wherein the secondary path adaptive filter is controlled by a secondary path coefficient controller that compares the error signal with the downlink audio and adapts to minimize components of the downlink audio present in the error signal but does not minimize components of the sidetone, so that the anti-noise signal is not affected by the ambient audio sounds present in the near-speech microphone signal.

16. The integrated circuit of claim 15, wherein the processing circuit further implements a primary adaptive filter that generates the anti-noise signal from the reference microphone signal.

17. The integrated circuit of claim 16, wherein the processing circuit further implements a copy of the secondary path adaptive filter that filters the reference microphone signal to provide a correlation input to the primary adaptive filter that is correlated with the error signal to control the adapting of the adaptive filter, wherein the processing circuit adapts the primary adaptive filter to minimize components of the error signal that are correlated with an output of the copy of the secondary path adaptive filter.

18. The integrated circuit of claim 15, wherein the processing circuit comprises:
   a coefficient control block that controls coefficients of the secondary path adaptive filter;
   a first combiner that combines the sidetone with the downlink audio; and
   a second combiner that combines an output of the first combiner with the anti-noise signal to generate the audio signal reproduced by the transducer, wherein a signal input of the secondary path adaptive filter receives the output of the first combiner.

19. The integrated circuit of claim 18, further comprising a third combiner for combining the downlink audio signal with internal source audio of the wireless telephone and wherein an output of the third combiner is provided to an input of the first combiner and to a correlation input of the coefficient control block.

20. The integrated circuit of claim 18, further comprising a sigma-delta noise-shaper having an input coupled to the output of the first combiner and an output coupled to the signal input of the secondary path adaptive filter.

21. The integrated circuit of claim 18, wherein the coefficient control block is a least-means-square control block.

* * * * *